(12) United States Patent
Ko et al.

(10) Patent No.: US 11,449,971 B2
(45) Date of Patent: Sep. 20, 2022

(54) METHOD AND APPARATUS WITH IMAGE FUSION

(71) Applicant: Samsung Electronics Co., Ltd., Suwon-si (KR)

(72) Inventors: Minsu Ko, Suwon-si (KR); Seungju Han, Seoul (KR); Jaejoon Han, Seoul (KR); Jihye Kim, Anyang-si (KR); SungUn Park, Suwon-si (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 16/223,382

(22) Filed: Dec. 18, 2018

(65) Prior Publication Data

US 2019/0251684 A1    Aug. 15, 2019

(30) Foreign Application Priority Data

Feb. 9, 2018   (KR) .................. 10-2018-0016451

(51) Int. Cl.
*G06K 9/00*   (2022.01)
*G06T 5/50*   (2006.01)
(Continued)

(52) U.S. Cl.
CPC .............. *G06T 5/50* (2013.01); *G06T 3/0081* (2013.01); *G06T 3/0093* (2013.01); *G06T 5/003* (2013.01);
(Continued)

(58) Field of Classification Search
CPC ............ G06K 9/00281; G06K 9/00288; G06T 2207/20212; G06T 2207/20221;
(Continued)

(56) References Cited

U.S. PATENT DOCUMENTS

2014/0218556 A1* 8/2014 Chen .................... H04N 5/2354
                                                              348/222.1
2015/0016728 A1* 1/2015 Parthasaralhy ........... G06T 7/33
                                                              382/195
(Continued)

FOREIGN PATENT DOCUMENTS

CN          106469442 A      3/2017
JP          2010-244251 A    10/2010
(Continued)

OTHER PUBLICATIONS

Singh, Richa, Mayank Vatsa, and Afzel Noore. "Integrated multi-level image fusion and match score fusion of visible and infrared face images for robust face recognition." Pattern Recognition 41.3 (2008): 880-893. (Year: 2008).*

(Continued)

*Primary Examiner* — Andrew M Moyer
(74) *Attorney, Agent, or Firm* — NSIP Law

(57) ABSTRACT

Disclosed is an image fusion method and apparatus. The fusion method includes detecting first feature points of an object in a first image frame from the first image frame; transforming the first image frame based on the detected first feature points and predefined reference points to generate a transformed first image frame; detecting second feature points of the object in a second image frame from the second image frame; transforming the second image frame based on the detected second feature points and the predefined reference points to generate a transformed second image frame; and generating a combined image by combining the transformed first image frame and the transformed second image frame.

19 Claims, 10 Drawing Sheets

(51) Int. Cl.
- *G06T 5/00* (2006.01)
- *G06V 40/16* (2022.01)
- *G06T 3/00* (2006.01)
- *G06T 7/00* (2017.01)

(52) U.S. Cl.
CPC .......... *G06T 5/006* (2013.01); *G06T 7/0002* (2013.01); *G06V 40/171* (2022.01); *G06V 40/172* (2022.01); *G06T 2207/20212* (2013.01); *G06T 2207/20221* (2013.01); *G06T 2207/30168* (2013.01); *G06T 2207/30201* (2013.01)

(58) Field of Classification Search
CPC . G06T 2207/30168; G06T 2207/30201; G06T 3/0081; G06T 3/0093; G06T 5/003; G06T 5/006; G06T 5/50; G06T 7/0002; G06T 11/60

See application file for complete search history.

(56) References Cited

U.S. PATENT DOCUMENTS

| | | | |
|---|---|---|---|
| 2015/0154229 A1* | 6/2015 | An | H04N 5/2354 348/222.1 |
| 2017/0046563 A1 | 2/2017 | Kim et al. | |
| 2020/0126182 A1* | 4/2020 | Cho | G06T 5/40 |

FOREIGN PATENT DOCUMENTS

| | | |
|---|---|---|
| JP | 4629740 B2 | 2/2011 |
| KR | 10-0858087 B1 | 9/2008 |
| KR | 10-1089287 B1 | 12/2011 |

OTHER PUBLICATIONS

Bu, Shuhui, et al. "Map2DFusion: Real-time incremental UAV image mosaicing based on monocular SLAM." 2016 IEEE/RSJ International Conference on Intelligent Robots and Systems (IROS). IEEE, 2016. (Year: 2016).*

Hasinoff, Samuel W., et al. "Burst photography for high dynamic range and low-light imaging on mobile cameras." ACM Transactions on Graphics (ToG) 35.6 (2016): 1-12. (Year: 2016).*

Extended European Search Report dated May 27, 2019 in counterpart European Patent Application No. 19152305.9 (13 pages in English).

Liu et al, "Fast Burst Images Denoising," ACM Transactions on Graphics, Nov. 19, 2014, vol. 33, No. 6, (9 pages in English).

Tico et al., "Low-light imaging solutions for mobile devices," Signals, Systems and Computers, IEEE, Nov. 1, 2009, Conference record of the forty-third Asilomar Conference, pp. 851-855, NJ, USA (5 pages in English).

Hasinoff et al., "Burst photography for high dynamic range and low-light imaging on mobile cameras," ACM Transactions on Graphics, Nov. 11, 2016, vol. 35, No. 6 (12 pages in English).

* cited by examiner

METHOD AND APPARATUS WITH IMAGE FUSION

CROSS-REFERENCE TO RELATED APPLICATIONS

This application claims the benefit under 35 USC § 119(a) of Korean Patent Application No. 10-2018-0016451 filed on Feb. 9, 2018 in the Korean Intellectual Property Office, the entire disclosure of which is incorporated herein by reference for all purposes.

BACKGROUND

1. Field

The following description relates to image processing technology.

2. Description of Related Art

In a situation where an image is captured in a low-luminance environment, it may be difficult to recognize objects in the captured image precisely. One of the approaches typically used to solve a low-luminance issue is to increase the exposure of the capturing device; however, increasing the exposure time of a camera or the performing image processing, for example, adjusting the brightness of the image captured results in undesired characteristics of the captured image even when both approaches increase the brightness of the image. For example, increasing the exposure time of the camera to capture the image may cause a motion blur in the image when the object moves, and performing image processing by adjusting the brightness of the image has a limit in showing the object clearly.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a an image fusion method, includes detecting first feature points of an object in a first image frame from the first image frame; transforming the first image frame based on the detected first feature points and predefined reference points to generate a transformed first image frame; detecting second feature points of the object in a second image frame from the second image frame; transforming the second image frame based on the detected second feature points and the predefined reference points to generate a transformed second image frame; and generating a combined image by combining the transformed first image frame and the transformed second image frame.

A feature for face verification may be extracted from the transformed combined image.

A user may be authenticated based on the extracted feature for face verification.

The transforming of the first image frame may include transforming the first image frame such that the first feature points are respectively placed at positions of the predefined reference points. The transforming of the second image frame may include transforming the second image frame such that the second feature points are respectively placed at the positions of the predefined reference points.

The transforming of the first image frame may include detecting a first object region from the first image frame based on the detected first feature points; and transforming the first object region through an image warping technique based on first feature points included in the detected first object region and the predefined reference points. The transforming of the second image frame may include detecting a second object region from the second image frame based on the detected second feature points; and transforming the second object region through the image warping technique based on second feature points included in the detected second object region and the predefined reference points.

The generating of the combined image may include combining the transformed first object region and the transformed second object region.

The generating of the combined image may include combining a first pixel value of the transformed first image frame and a second pixel value of the transformed second image frame.

The combining of the first pixel value and the second pixel value may include any one or any combination of any two or more of a summing, an averaging, a weighted summing, and a weighted averaging of the first pixel value and the second pixel value at corresponding positions in the transformed first image frame and the transformed second image frame.

The image fusion method may further include measuring an image quality of the first image frame or the transformed first image frame; and determining, in response to the measured image quality satisfying a preset condition, whether to detect the first feature points from the first image frame or obtain the combined image based on the transformed first image frame.

The measuring may include measuring a brightness of the first image frame, and determining, in response to the measured brightness of the first image frame being less than a preset threshold value, whether to detect the first feature points from the first image frame or obtain the combined image based on the transformed first image frame.

The image fusion method may further include measuring an image quality of the second image frame or the transformed second image frame; and determining, in response to the measured image quality satisfying a preset condition, whether to detect the second feature points from the second image frame or obtain the combined image based on the transformed second image frame.

The image fusion method may further include detecting third feature points of the object in a third image frame from the third image frame; transforming the third image frame based on the detected third feature points and the predefined reference points to generate a transformed third image frame; and combining the generated combined image and the transformed third image frame.

The detecting of the first feature points may include detecting facial landmarks from the first image frame, and the detecting of the second feature points comprises detecting facial landmarks from the second image frame.

The image fusion method may further include transforming the combined image based on a correspondence between the second feature points and the predefined reference points.

A non-transitory computer-readable storage medium storing instructions that, when executed by a processor, may cause the processor to perform the image fusion method.

In another general aspect, an image fusion apparatus, includes a processor configured to: detect first feature points of an object in a first image frame from the first image frame, transform the first image frame based on the detected first feature points and predefined reference points to generate a transformed first image frame, detect second feature points of the object in a second image frame from the second image frame, transform the second image frame based on the detected second feature points and the predefined reference points to generate a transformed second image frame, and generate a combined image by combining the transformed first image frame and the transformed second image frame.

The processor may be further configured to generate the transformed first image frame by transforming the first image frame such that the first feature points are respectively placed at positions of the predefined reference points, and generate the transformed second image frame by transforming the second image frame such that the second feature points are respectively placed at the positions of the predefined reference points.

The processor may be further configured to: detect a first object region from the first image frame based on the detected first feature points, and transform the first object region through an image warping technique based on first feature points included in the detected first object region and the predefined reference points, and detect a second object region from the second image frame based on the detected second feature points, and transform the second object region through the image warping technique based on second feature points included in the detected second object region and the predefined reference points.

The processor may be further configured to generate the combined image by combining a first pixel value of the transformed first image frame and a second pixel value of the transformed second image frame.

The combination of the first pixel value and the second pixel value may include any one or any combination of any two or more of a summing, an averaging, a weighted summing, and a weighted averaging of the first pixel value and the second pixel value at corresponding positions in the transformed first image frame and the transformed second image frame.

The processor may be further configured to transform the combined image based on a correspondence between the second feature points and the predefined reference points.

In another general aspect, a processor implemented image fusion method, includes: detecting respective feature points of an object in a series of image frames; transforming each of the image frames based on the detected respective feature points and predefined reference points to generate corresponding transformed image frames, respectively; and generating a combined image by combining any two or more of the corresponding transformed image frames.

The series of image frames may be consecutively captured frames.

A total number of the detected feature points in each of the any two or more of the transformed image frames in the combined image may not be equal.

A feature type of the feature points in each of the any two or more of the transformed image frames in the combined image may be different.

The transforming of the image frames may include transforming each of the image frames such that the respective feature points are placed at positions of the predefined reference points.

The transforming of the image frames may include detecting an object region from each of the image frames based on the detected respective feature points; and transforming each of the object regions through an image warping technique based on respective feature points included in the detected object region and the predefined reference points.

The generating of the combined image may include combining of corresponding pixel values of each of the transformed image frames.

The detecting of the respective feature points may include detecting respective facial landmarks from each of the image frames.

The combining of the corresponding pixel values may include any one or any combination of any two or more of a summing, an averaging, a weighted summing, and a weighted averaging of the pixel values at corresponding positions in the transformed image frames.

Other features and aspects will be apparent from the following detailed description, the drawings, and the claims.

Figure 1:
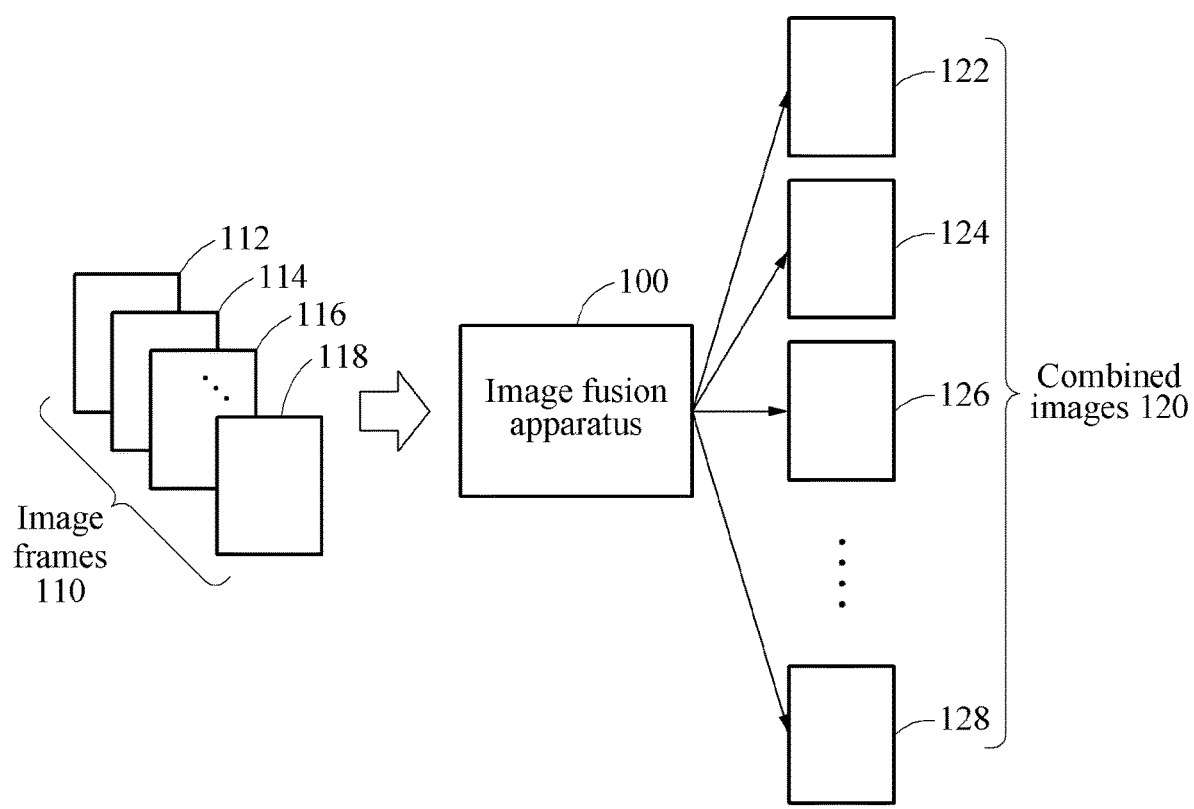
FIG. 1 illustrates an example of an operation of an image fusion apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure.

FIG. 1 illustrates an example of an operation of an image fusion apparatus.

Referring to FIG. 1, an image fusion apparatus 100 is an apparatus that generates each of the combined images 120, including combined images 122, 124, 126 ... 128, by fusing at least two image frames 110 using a processor. For example, the image fusion apparatus 100 generates a combined image by fusing a current image frame and n previous image frames which are captured precedent or subsequent in time to the current image frame, where n is a natural number. For example, assuming that the current image frame is an image frame 116 and the image fusion apparatus 100 is to generate a combined image based on three image frames, the image fusion apparatus 100 may generate a combined image by fusing image frames 112, 114 and 116. If the image fusion apparatus 100 is to generate a combined image based on two image frames, the image fusion apparatus 100 may generate a combined image by fusing the image frame 116 which is the current image frame and the image frame 114 which is a previous image frame. However, the order in which the frames are selected is not limited thereto. For example, the image fusion apparatus 100 may generate a combined image by fusing image frames 112, 114 and 116, where the current image is 112 and image frames 114 and 116 are subsequent image frames. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The image frames 110 include image frames 112, 114, 116 ... 118 which are captured temporally consecutively by a camera. Here, the term "image frame" may be replaced with "input image" or "image." In situations where an image frame is captured in a low-luminance dark environment, it is challenging to clearly identify an object in the image frame or subsequent image frames captured in the same environment. In examples where object identification is important like face verification, there may be a desire to clearly identify a face region in an image frame even if the image frame was captured in a dark environment. Clear identification of the facial region in an image greatly affects the accuracy of using the image, in an example, for face verification operation of the image fusion apparatus 10. As a general solution to overcome the drawback of an image frame captured in the low-luminance environment, typical approaches used include increasing the exposure time of the camera used in acquiring the image frame. However, when the controller controls the exposure time to be increased, the probability of causing a motion blur in the image frame when the camera and/or an object moves increases, which hinders object identification in the image.

In an example, the image fusion apparatus 100 generates a combined image having an improved brightness over each of the original image frames captured in a low-luminance environment in which an object is relatively easy to identify. In this example, rather than simply combining the image frames, the image fusion apparatus 100 transforms the image frames based on feature points of each of the image frames and combines the transformed image frames based on one or more of the feature points, thereby minimizing an occurrence of a motion blur. For example, the image fusion apparatus 100 extracts feature points representing shape features of an object from the image frames, transforms the image frames such that the extracted feature points are places at positions of reference points, and combines the transformed images, thereby generating a combined image having an improved brightness in which motion blur is minimized. The image fusion apparatus 100 may be implemented as, or be used in a user authentication system, a financial transaction authentication system, access control, and monitoring system, and an object recognition system using biometrics.

Hereinafter, an operation of the image fusion apparatus 100 will be described further with reference to the drawings.

Figure 2:
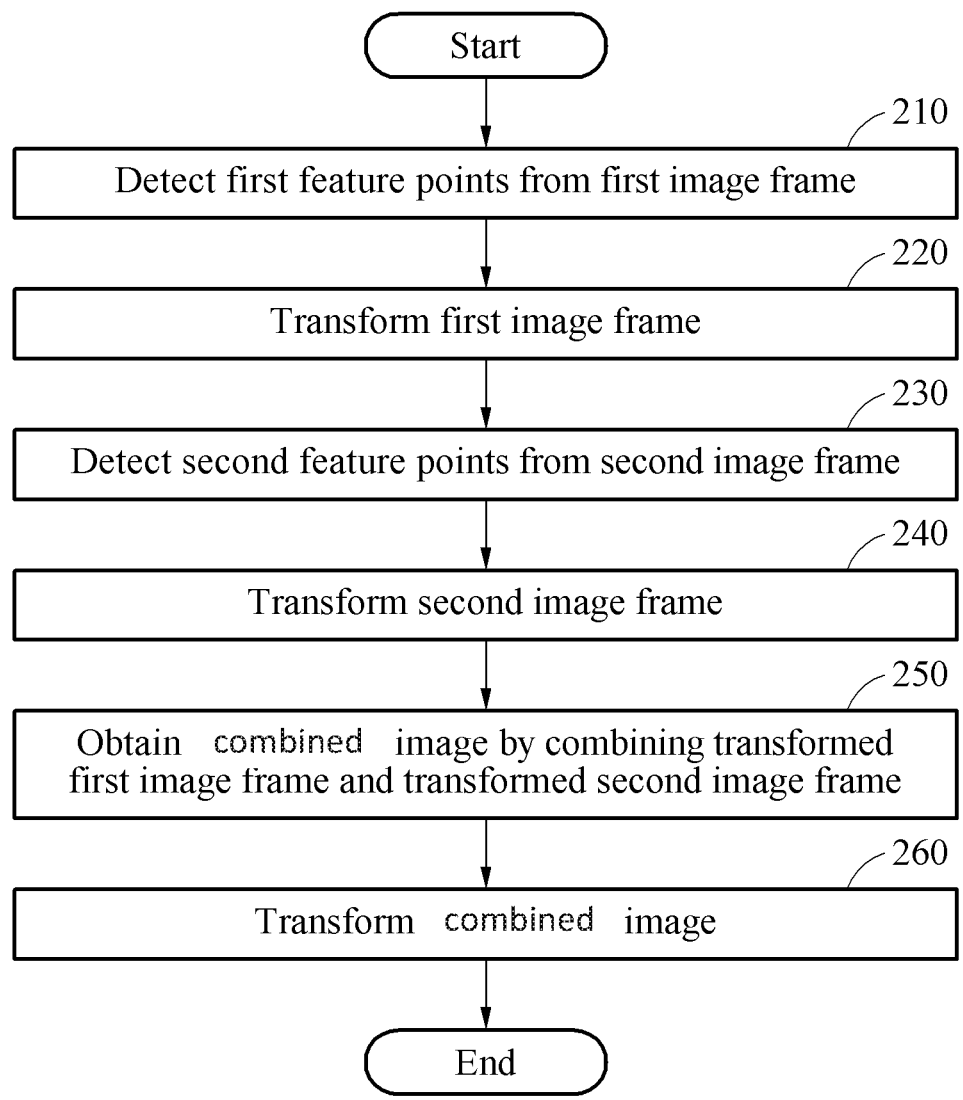
FIG. 2 is a flowchart illustrating an example of an image fusion method.

FIG. 2 is a flowchart illustrating an example of an image fusion method.

Operations of an image fusion method may be performed in an order as shown in FIG. 2, or a portion of the operations may be omitted, or the operations may be performed in a different order without departing from the technical spirit and the scope of examples set forth hereinafter. Further, the operations as shown in FIG. 2 may be performed in parallel or concurrently. For example, operation 210, 220 and operation 230, 240 may be performed in parallel.

In operation 210, an image fusion apparatus detects first feature points of an object shown in a first image frame from the first image frame. Different feature points are extracted based on the type of object. For example, in a case in which the object is a face, facial landmarks such as both endpoints of an eye, an eye center, an endpoint of a nose, and both endpoints of a mouth may be extracted from the first image frame. In a case in which the object is a thing, for example, feature points representing shape features of the corresponding object may be extracted from the first image frame. For example, in a case in which the object is a license plate of a vehicle, four vertices of the rectangular license plate may be extracted as the feature points.

In operation 220, the image fusion apparatus transforms the first image frame based on the detected first feature points and predefined reference points. Here, the reference points have pre-fixed positions for the particular type of object, e.g., plural predefined types objects, irrespective of positions of the first feature points extracted from the first image frame. For example, in a case in which the object is determined to be a face, the positions of the reference points are reference positions which are fixed on facial parts such as an eye, a nose, and a mouth.

The image fusion apparatus transforms the first image frame using an image warping technique such that the first feature points are placed at the positions of the reference points. For example, the image fusion apparatus calculates an affine transform matrix indicating a correspondence between the first feature points and the reference points based on position values of the first feature points and position values of the reference points, and transforms the first image frame by applying the calculated affine transform matrix to position values of pixels of the first image frame. In another example, the process of transforming the first image frame includes a process of detecting a first object region, for example, a face region, from the first image frame based on the first feature points and transforming the first object region through image warping such that first feature points included in the detected first object region are placed at the positions of the reference points.

In operation 230, the image fusion apparatus detects second feature points, for example, facial landmarks, of the object shown in a second image frame from the second image frame, in the same or similar manner as described in operation 210.

In operation 240, the image fusion apparatus transforms the second image frame based on the second feature points and the reference points, in the same or similar manner as described in operation 220. For example, the image fusion apparatus transforms the second image frame using the affine transform matrix such that the second feature points are placed at positions of the reference points. In another example, the process of transforming the second image frame includes a process of detecting a second object region from the second image frame based on the detected second feature points and transforming the second object region through image warping such that second feature points included in the detected second object region are placed at the position of the reference points. Here, the positions of the reference points are the same as those of the reference points used in operation 220.

In operation 250, the image fusion apparatus obtains a combined image by combining the transformed first image frame and the transformed second image frame. This process includes, for example, a process of combining the transformed first object region of the first image frame and the transformed second object region of the second image frame. The image fusion apparatus generates the combined image by combining a first pixel value of the transformed first image frame and a second-pixel value of the transformed second image frame. A combination of the first pixel value and the second pixel value includes, for example, a sum, an average, a weighted sum, or a weighted average of the first pixel value and the second pixel value at corresponding or same positions in the transformed first image frame and the transformed second image frame. However, examples are not limited thereto.

In another example, image qualities of the image frames are considered for selecting an image frame to be used for image fusion. The image fusion apparatus measures the image quality of the input first image frame or the transformed first image frame, and, in response to the measured image quality being determined to satisfy a preset condition or threshold, determines to detect the first feature points from the first image frame or determines to obtain the combined image based on the transformed first image frame. For example, the image fusion apparatus measures the brightness of the first image frame, and, in response to the measured brightness of the first image frame being less than a preset threshold value, determines to detect the first feature points from the first image frame or determines to obtain the combined image based on the transformed first image frame. In response to the brightness of the first image frame being greater than or equal to the threshold value, the image fusion apparatus determines that the corresponding first image frame was not captured in a low-luminance environment and, thus, excludes the first image frame from obtaining a combined image. In other words, based on the brightness of the first image frame being greater than or equal to the threshold value, the corresponding first image frame is determined to be captured in a luminance environment of sufficient quality for image processing or verification. Similarly, the image fusion apparatus measures the image quality, for example, a brightness, of the input second image frame or the transformed second image frame, and, in response to the measured image quality satisfying the preset condition, determines to detect the second feature points from the second image frame or determines to obtain the combined image based on the transformed second image frame. For example, in response to the brightness of the second image frame being greater than or equal to the threshold value, the image fusion apparatus does not use the corresponding second image frame to obtain the combined image. In other words, based on the brightness of the second image frame being greater than or equal to the threshold value, the corresponding second image frame is determined to be captured in a luminance environment of sufficient quality for image processing or verification.

In operation 260, the image fusion apparatus transforms the combined image. In an example, operation 260 is selectively performed. The image fusion apparatus transforms the combined image based on a correspondence between the second feature points of the second image frame, which is a recent input image frame, and the reference points. When it is determined that the affine transform matrix was determined based on the positions of the second feature points and the positions of the reference points, and the second image frame was transformed by the corresponding affine transform matrix in operation 240, the image fusion apparatus restores the shape of the object shown in the combined image to its original shape by applying an inverse transform matrix of the above affine transform matrix to the combined image. Then, the transformed combined image is used for a purpose that may include face verification where features for face verification are extracted from the transformed combined image.

Figure 5:
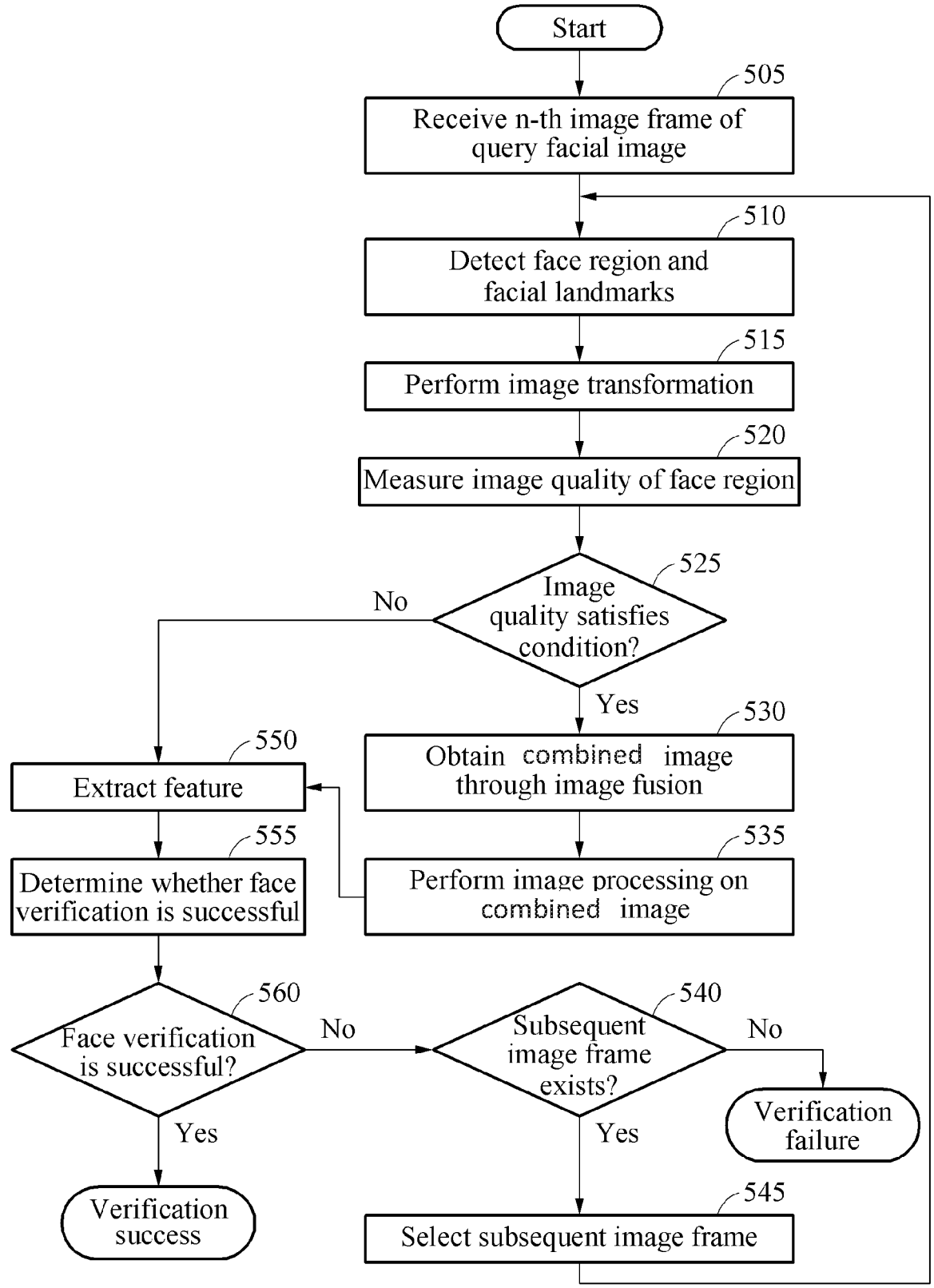
FIG. 5 is a flowchart illustrating an example of applying an image fusion method with face verification.
Figure 8:
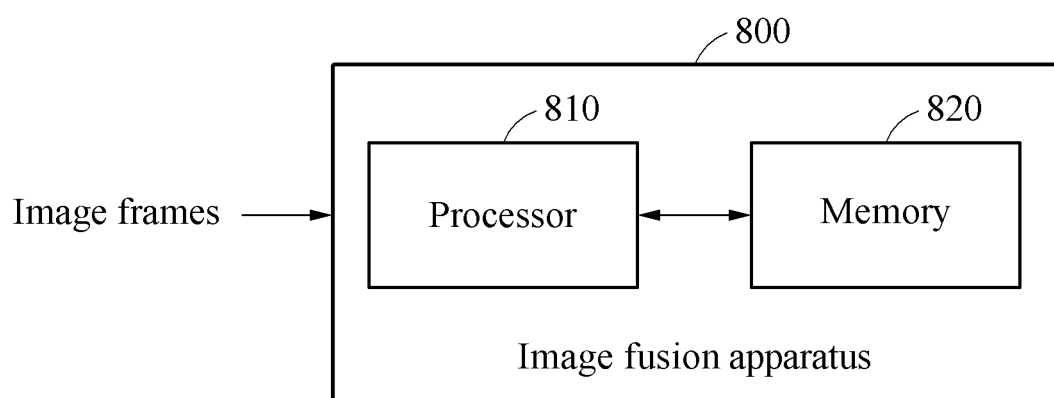
FIG. 8 illustrates an example of a configuration of an image fusion apparatus.
Figure 9:
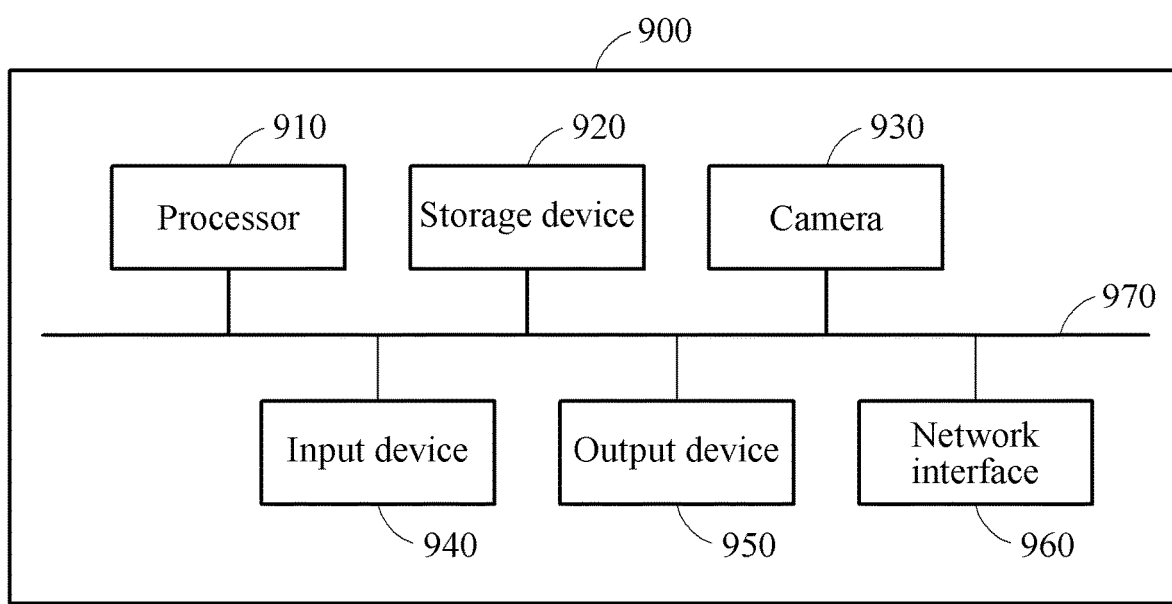
FIGS. 9 and 10 illustrate examples of configurations of a computing apparatus.
Figure 10:
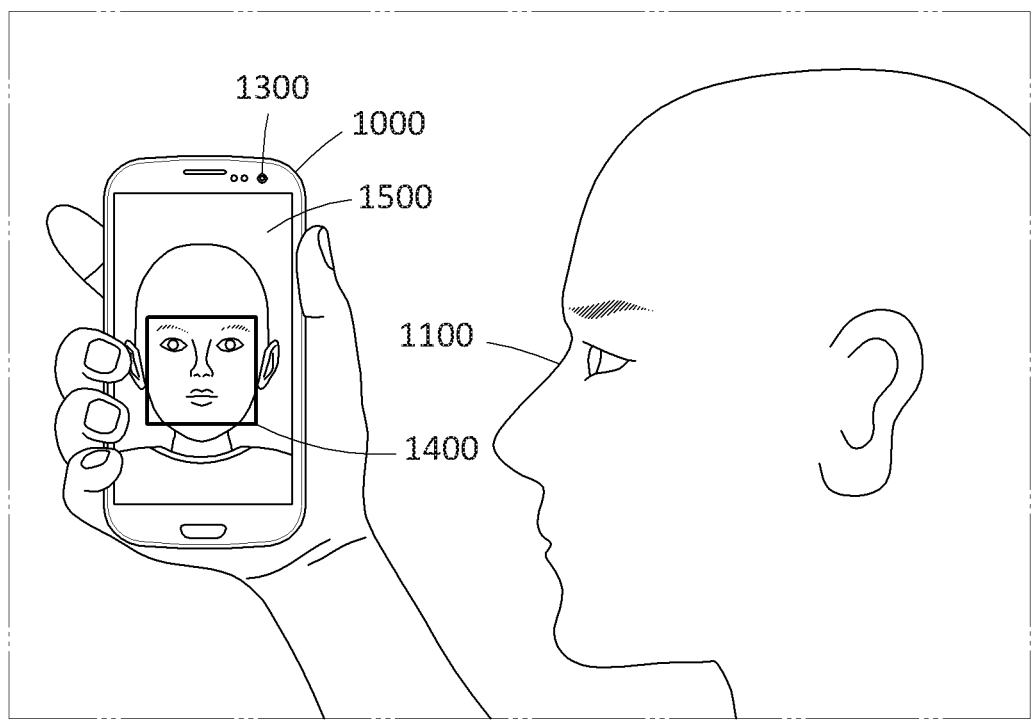

For example, in examples, such as the image fusion apparatus 100 of FIG. 1, the image verification apparatus of FIG. 5, the image fusion apparatus 800 of FIG. 8, the computing apparatus 900 of FIG. 9, and/or the computing apparatus 1000 of FIG. 10, each of which herein can individually and collectively be referred to as respective image fusion apparatuses, each image fusion apparatus includes one or more processors configured to perform image capturing and combination, and in various examples are further configured to store the combined image and/or perform face (or object or text) verification or recognition by extracting face (object or text) features from the combined image using an extractor represented by the one or more processors, such as through a machine learning trained extractor, and comparing the extracted features to registered extracted features for/of one or more verification images, or otherwise through another object or text specific verification or recognition model, e.g., other verification or recognition machine trained model, and to indicate a verification or recognition result, or perform further operations based on the verification or recognition result. Here, as explained herein, in an example when image quality of either or each of the first frame image and the second image frame is determined to meet a threshold, the extractor may alternatively or additionally extract the features for the comparison from the first image frame and/or the second image frame. Using the face verification or recognition as an example, the verification or recognition result indicates, e.g., either through explicit or inferential indications, whether a face included in the verification image corresponds to a valid user or is recognized, for example. For example, when the face included in the verification image corresponds to the valid user, the verification result may include information indicating that verification has succeeded or information of the recognized person, and when the face included in the verification image does not correspond to the valid user or not recognized, the verification result may alternatively include information indicating that the verification or recognition has failed. Alternatively, such as where face verification or recognition is automatically performed or performed in a background operation, e.g., without request or potential knowledge of the user, a successful or failed verification or recognition result may not be explicitly reported to the user, but the successful or failure indications may be through inferential operations to control/institute additional operations (or non-operation of the same), or output results may be explicitly indicated to another device or server that may receive or monitor results of the face verification/recognition or results of face verifications/recognitions of one or more captured faces from one or more such image fusion apparatuses. Thus, the verification or recognition result may be indicated through, and used for, implementing or initiating of further processing of the image fusion apparatus, such as further processing operations in which user verification or recognition may be beneficial or required. As only examples, when the face included in the input image is verified or recognized as a face of the valid user by the image fusion apparatus, the image fusion apparatus may unlock a user interface of the image fusion apparatus, such as when the image fusion apparatus is a user terminal, e.g., a smart phone or tablet, and the unlocking enables the user to access additional information or perform additional functions of user terminal, or the image fusion apparatus may control or indicate to an external device to permit entry of a user to a restricted area due to the face verification/recognition, or may authorize financial or payment transactions to proceed or be initiated, as well as alternative operations or processes depending on embodiment.

In a case in which a third image frame is input into the image fusion apparatus, the image fusion apparatus detects third feature points of the object shown in the third image frame from the third image frame, and transforms the third image frame based on the detected third feature points and the reference points, in the same manner described above in relation to the first image frame and the second image frame. When it is determined that the combined image is to be generated based on three image frames, the image fusion apparatus obtains a new combined image by combining the combined image obtained in operation 250 and the transformed third image frame. The combined image of operation 250 and the transformed third image frame are combined using any one or any combination of any two or more of a sum, an average, a weighted sum, or a weighted average of pixel values at corresponding positions in the combined image and the third image frame.

As described above, the image fusion apparatus transforms image frames such that feature points of the image frames are placed at fixed positions of reference points and fuses the transformed image frames, thereby providing a combined image in which a motion blur and noise are reduced, and features of the detected object are well represented. In a case in which the combined image is used for an image-based authentication system where it is important to extract features of an object accurately, the accuracy of recognition improves.

Figure 3:
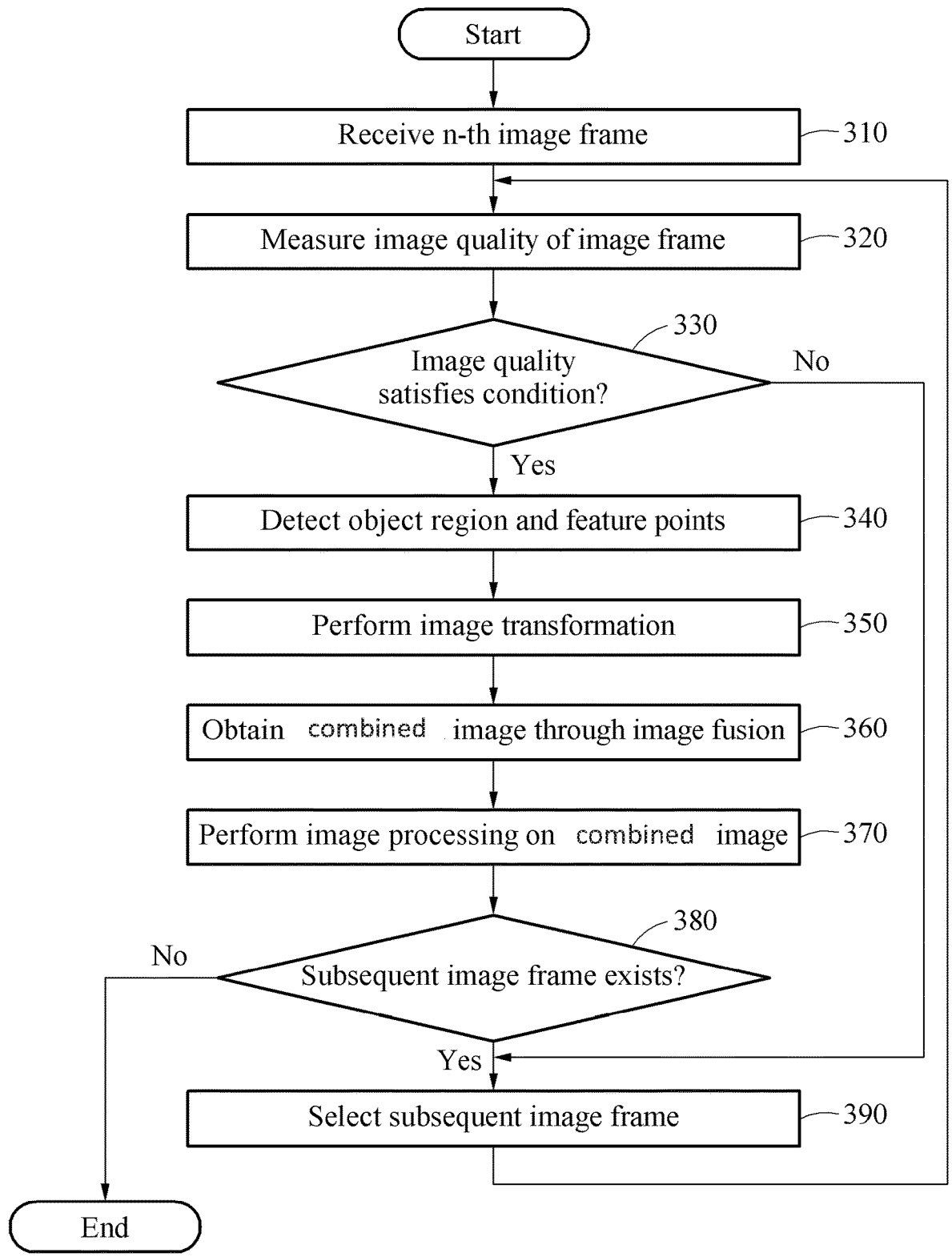
FIGS. 3 and 4 are flowcharts illustrating examples of image fusion methods.

FIG. 3 is a flowchart illustrating an example of an image fusion method.

Referring to FIG. 3, in operation 310, an image fusion apparatus receives an n-th image frame, n being a natural number. In operation 320, the image fusion apparatus measures the image quality of the received image frame. For example, the image fusion apparatus measures brightness or a blur level of the image frame. The image quality of the image frame is used to determine whether to use or include the corresponding image frame in the generation of a combined image.

In operation 330, the image fusion apparatus determines whether the measured image quality satisfies a preset condition. For example, the image fusion apparatus determines whether the brightness of the image frame is less than a threshold value. In response to the image quality satisfying the preset condition, the image fusion apparatus performs operation 340. In response to the image quality not satisfying the preset condition, the image fusion apparatus performs operation 390 to select a subsequent image frame. Through this, an image frame captured in a bright environment is prevented from being used to generate a combined image, and whether images frames to be used for image fusion are consecutively received is determined. That is, in the example, the image fusion may not necessary for an image frame captured in a bright environment due to having a brightness high enough to define features of an object. In an example, in a case in which the image quality does not satisfy the preset condition, the image fusion process performed so far is terminated, and a subsequent image frame is designated as a first image frame of the image fusion process such that the image fusion process is restarted.

In operation 340, the image fusion apparatus detects an object region and feature points of a target object from the image frame. In operation 350, the image fusion apparatus generates a transformed image frame by performing image transformation, for example, image warping, on the image frame such that the feature points detected from the image frame are placed at fixed positions of corresponding reference points. In an example, the image fusion apparatus extracts a region on which the image transformation is to be performed from the image frame based on the detected feature points, determines a transform matrix for defining a transformation relationship between positions of feature points included in the extracted region and the positions of the reference points, and generates the transformed image frame by applying the determined transform matrix to the image frame or the corresponding extracted region.

In operation 360, the image fusion apparatus obtains or generates a combined image through image fusion. The image fusion apparatus obtains the combined image by fusing a previously transformed and stored image frame and a currently transformed image frame. Here, the image fusion includes a process of fusing pixel values at corresponding positions between the transformed image frames through a sum, an average, a weighted sum, or a weighted average of the pixel values.

In operation 370, the image fusion apparatus performs specific image processing on the combined image for a purpose of using the combined image. For example, the image fusion apparatus performs inverse image warping on the combined image to restore the shape of the object shown in the combined image to its original shape. In this example, the inverse image warping is performed to place the feature points of the object shown in the combined image at positions of corresponding feature points in the current image frame.

In operation 380, the image fusion apparatus determines whether a subsequent image frame exists. In a case in which a subsequent image frame exists, the image fusion apparatus selects the subsequent image frame, in operation 390. After the selection, the image fusion apparatus reperforms the process of operations 320 through 380 with respect to the selected subsequent image frame.

Figure 4:
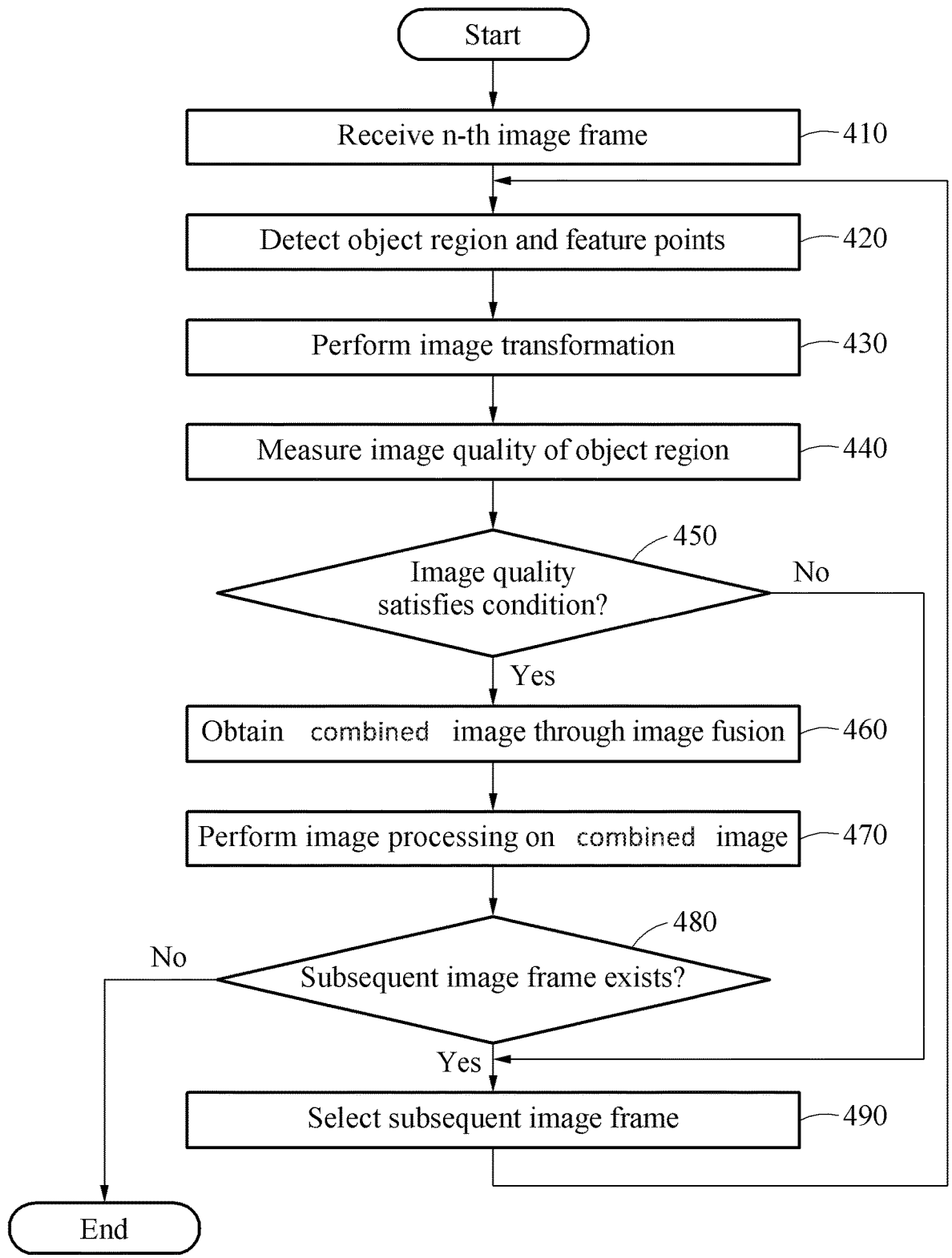

FIG. 4 is a flowchart illustrating an example of an image fusion method.

Referring to FIG. 4, operation 410, operation 420, operation 430, operation 440, operation 450, operation 460, operation 470, operation 480 and operation 490 may correspond to operation 310, operation 340, operation 350, operation 320, operation 330, operation 360, operation 370, operation 380, and operation 390 of FIG. 3, respectively, noting that examples are not limited thereto. Thus, for convenience of explanation, description provided with reference to FIG. 3 is applicable to operations of FIG. 4.

In FIG. 4, measuring the image quality and operation 450 of determining whether the measured image quality satisfies a preset condition are performed after operation 430 of performing image transformation. Further, in operation 420, an object region is detected from an image frame. In operation 430, image transformation such as an image warping technique is performed on the detected object region such that feature points are placed at positions of corresponding reference points. Then, in operation 440, the image quality, for example, brightness, of the transformed object region is measured. In operation 450, whether the image quality satisfies the preset condition is determined. By considering the image quality of the object region which is a region of interest, it is possible to apply image fusion to an image frame which is bright overall but includes a dark object region, like an image frame captured against the light.

FIG. 5 is a flowchart illustrating an example of applying an image fusion method with face verification.

As explained above, face verification is a method for user authentication by determining whether a user attempting an authentication is a valid user based on the facial information of the user. An image fusion method described herein is used, for example, to provide an image that shows facial features more clearly in a face verification process, despite the image being captured in a low-luminance environment. In a case of image-based object recognition technology such as face verification, how well features of an object are shown in an image greatly affects a recognition accuracy. When a blur or noise level shown in the image is relatively high, it is relatively difficult to extract the features of the object accurately from the corresponding image. An image fusion apparatus generates an image in which a blur or noise is reduced while brightness thereof is improved, through the image fusion process performed based on the feature points as described above.

Referring to FIG. 5, in operation 505, a face verification apparatus receives an n-th image frame of a query facial image, n being a natural number. The query facial image is an image to be used for face verification. In operation 510, the face verification apparatus detects a face region from the image frame and detects facial landmarks from the detected face region. To detect the face region, a Haar-based cascade AdaBoost classifier or a Viola-Jones detector may be used. However, examples are not limited thereto. In an example, an image normalization process such as image scaling or image cropping is performed with respect to the face region of the image frame.

In operation 515, the face verification apparatus performs image transformation with respect to the face region such that the face region is transformed. For example, the face verification apparatus performs image warping with respect to the face region such that the landmarks detected from the face region are placed at positions of reference points in a predefined face region.

In operation 520, the face verification apparatus measures the image quality of the transformed face region. In operation 525, the face verification apparatus determines whether the image quality satisfies a preset condition. For example, the face verification apparatus measures a brightness of the transformed face region and determines whether the measured brightness is less than a threshold value.

In response to the image quality satisfying the preset condition, the face verification apparatus obtains a combined image by combining a face region transformed in a previous image frame and the face region transformed in operation 515 through image fusion, in operation 530. This process includes a process of fusing pixel values at corresponding positions in the transformed face regions. In an example, the face verification apparatus obtains the combined image by combining transformed face regions of at least three image frames, in addition to two image frames.

In operation 535, the face verification apparatus performs image processing on the combined image such that the obtained combined image has a shape more suitable for face verification. For example, the face verification apparatus performs a process of restoring the shape of a face to its original shape by performing inverse image warping on the combined image, gamma correction for clearly representing facial features shown in the combined image and/or image processing for reducing a color variation.

In operation 550, the face verification apparatus extracts a feature from the processed combined image. For example, the face verification apparatus extracts the feature or a feature vector using a neural network-based feature extractor. In response to a determination of operation 525 that the image quality of the face region included in the current image frame does not satisfy the preset condition, for example, in response to the brightness of the detected face region being greater than or equal to the threshold value, the face verification apparatus extracts a feature from the current image frame, in operation 550, without performing operations 530 and 535. In this example, the image fusion process is initialized such that a previously stored result of image transformation on the image frame and the combined image are removed from a storage such as a memory.

In operation 555, the face verification apparatus determines whether the face verification is successful based on the extracted feature. The face verification apparatus calculates a matching score based on a similarity between the extracted feature and a pre-registered feature, and determines that the face verification is successful in response to the calculated matching score satisfying a preset condition, for example, in response to the matching score being higher than a threshold value. The matching score is determined, for example, based on a similarity or a distance between the extracted feature vector and a pre-registered feature vector. As noted above, the success or failure may be indicated through inferential operations to control/institute additional operations (or non-operation of the same), or output results that may be explicitly indicated to another device or server that may receive or monitor results of the object verification or results of object verifications of one or more captured objects from one or more such facial or object verification apparatuses. Thus, the verification result may be indicated through, and used for, implementing or initiating of further processing of the face or object verification apparatus, such as further processing operations in which user verification may be beneficial or required.

In operation 560, the face verification apparatus determines whether the face verification is successful. In response to a determination that the face verification is unsuccessful, for example, failed, the face verification apparatus determines whether a subsequent image frame exists, in operation 540. In response to a determination that a subsequent image frame does not exist, the face verification apparatus determines that the face verification has failed. In response to a determination that a subsequent image frame exists, the face verification apparatus selects the subsequent image frame, and repeats the above process with respect to the subsequent image frame, in operation 545.

Through the above process, although face verification is to be performed based on a facial image captured in a low-luminance environment, the face verification is performed more accurately even in the low-luminance environment by performing an image fusion process based on feature points.

Figure 6:
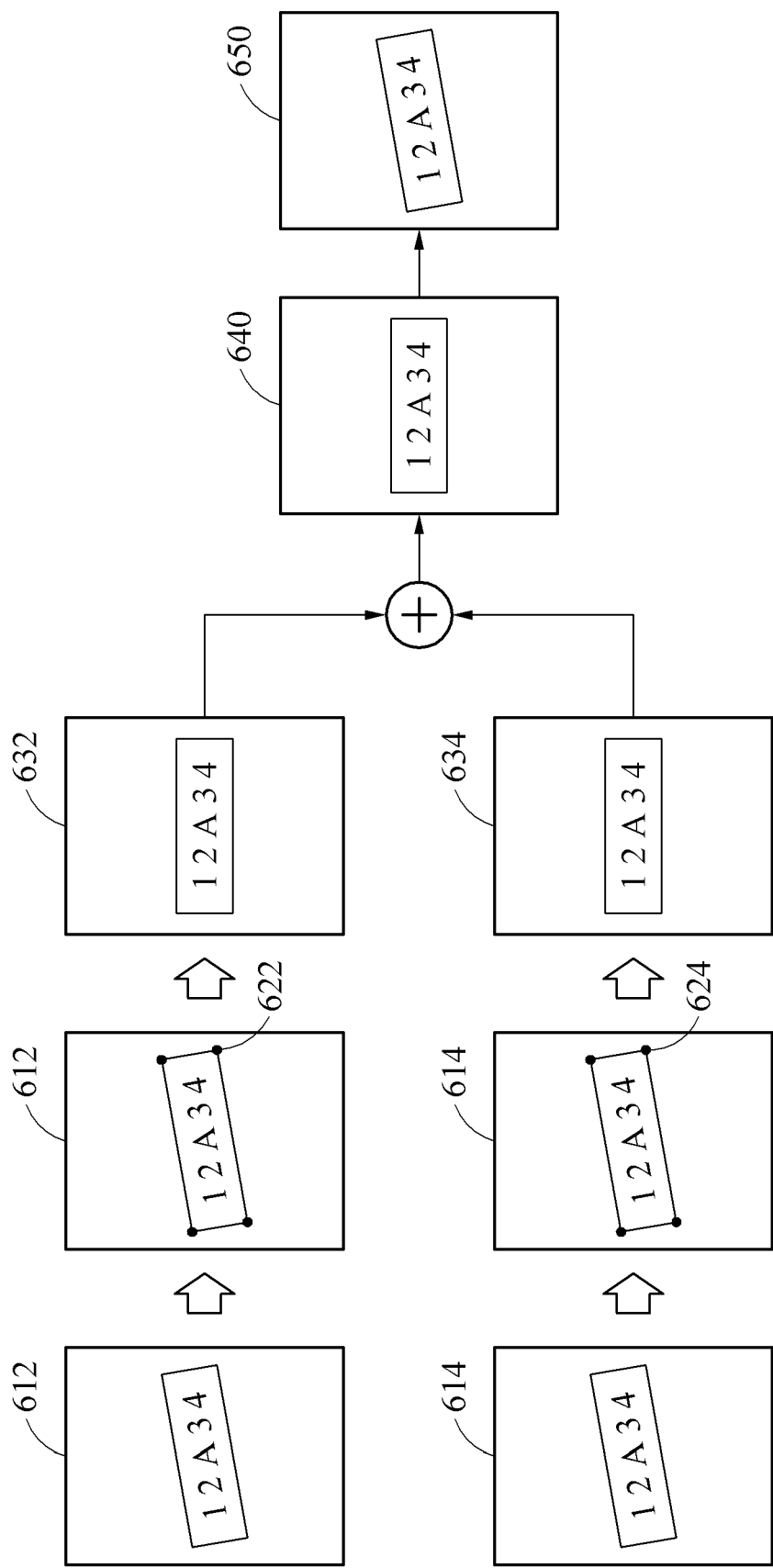
FIGS. 6 and 7 illustrate examples of performing image fusion based on a plurality of image frames.

FIG. 6 illustrates an example of an image fusion method.

Referring to FIG. 6, an example of an image fusion method, in detail, an example of performing image fusion with respect to a first image frame 612 and a second image frame 614 including a vehicle license plate is illustrated. In an example, the first image frame 612 and the second image frame 614 are temporally consecutive image frames or temporally adjacent image frames which are not immediately consecutive though. For example, the first image frame 612 and the second image frame 614 are an (n−1)-th image frame and an n-th image frame, respectively, or an (n−m)-th image frame and the n-th image frame, respectively. Here, n is a natural number, and m is a natural number greater than or equal to "2".

When the first image frame 612 is input, the brightness of the first image frame 612 is measured. In response to a determination that the first image frame 612 was captured in a dark environment since the measured brightness is less than a threshold value, an image fusion apparatus detects feature points 622 from the first image frame 612. For example, four vertices of the vehicle license plate are detected as the feature points 622. A region of the vehicle license plate is detected from the first image frame 612 based on the detected feature points 622. Then, the image fusion apparatus generates a transformed first image frame 632 by performing image warping such that the feature points 622 are placed at positions of predefined reference points.

The same process is also performed with respect to the second image frame 614. When the second image frame 614 is input, the brightness of the second image frame 614 is measured. In response to the measured brightness being less than the threshold value, the image fusion apparatus detects feature points 624 from the second image frame 614. A region of the vehicle license plate is detected from the second image frame 614 based on the detected feature points 624. Then, the image fusion apparatus generates a transformed second image frame 634 by performing image warping such that the feature points 624 are placed at the positions of the predefined reference points. However, in an example, feature points 622 and feature points 624 do not have the same number of detected feature points, e.g., four vertices of the vehicle license plate could have been detected in the feature points 622 and only three vertices of the vehicle license plate could have been detected in the feature points 624.

In an example, the brightness of the image frame is measured after image warping is performed. In this example, the measured brightness of the image frame should be less than a preset threshold value to continuously perform the image fusion process based on the corresponding image frame. If the measured brightness is greater than or equal to the threshold value, the image fusion process is terminated or initialized.

The image fusion apparatus generates a combined image 640 by combining the transformed first image frame 632 and the transformed second image frame 634. For example, the image fusion apparatus generates the combined image 640 by fusing a pixel value of the transformed first image frame 632 and a pixel value of the transformed second image frame 634. Then, the image fusion apparatus generates a restored combined image 650 by restoring the shape of the vehicle license plate shown in the combined image 640 to its original shape shown in the image frame. For example, the image fusion apparatus restores the shape of the vehicle license plate by applying an inverse transform matrix of a transform matrix used for the above image warping to the combined image 640.

Figure 7:
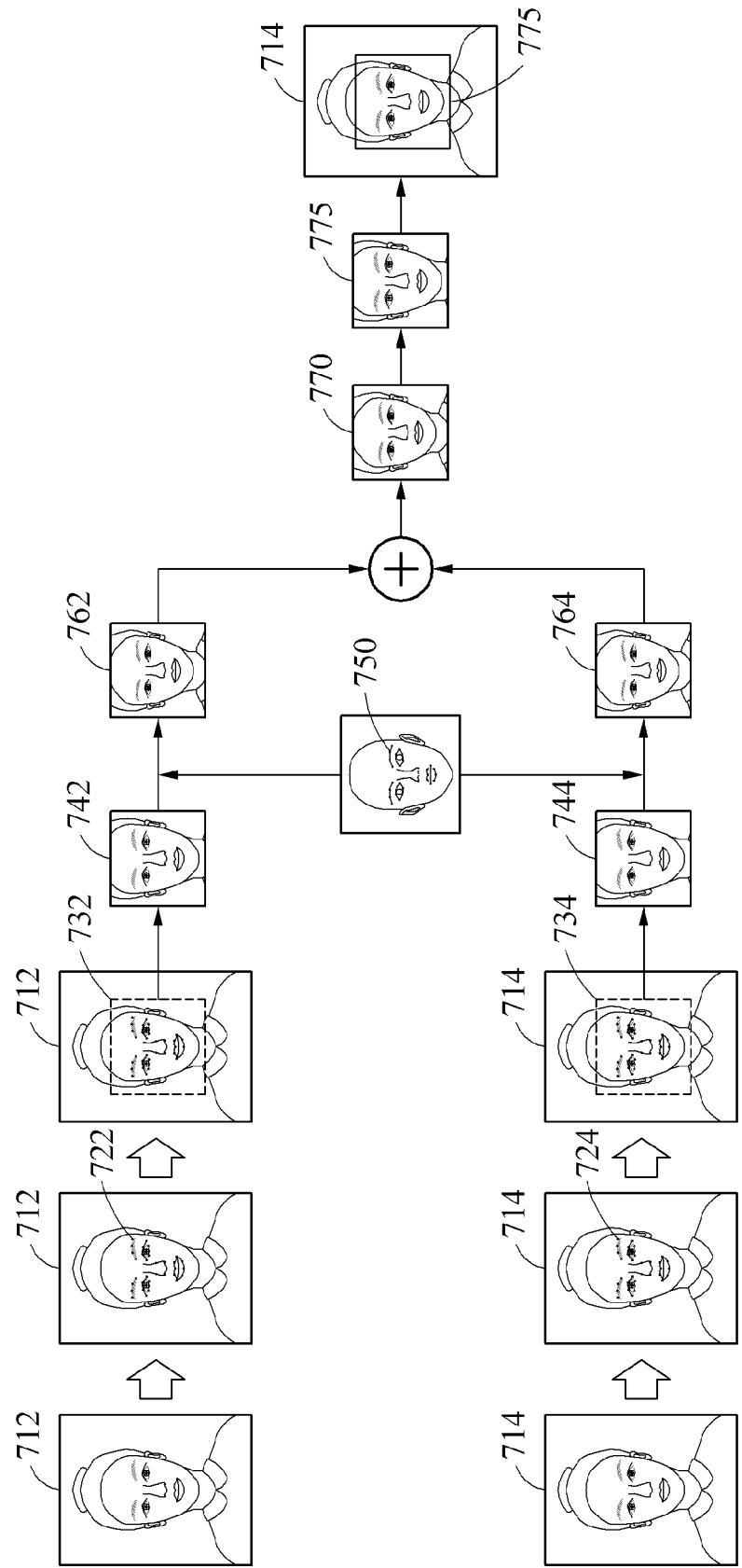

FIG. 7 illustrates an example of an image fusion method.

Referring to FIG. 7, an example of an image fusion method, in detail, an example of performing image fusion with respect to a first image frame 712 and a second image frame 714 including a face region is illustrated. In an example, the first image frame 712 and the second image frame 714 are temporally consecutive image frames or temporally adjacent image frames which are not immediately consecutive though. For example, the first image frame 712 and the second image frame 714 are an (n−1)-th image frame and an n-th image frame, respectively, or an (n−m)-th image frame and the n-th image frame, respectively. Here, n is a natural number, and m is a natural number greater than or equal to "2".

When the first image frame 712 is input, the brightness of the first image frame 712 is measured. In response to the measured brightness being less than a threshold value, an image fusion apparatus detects facial landmarks 722 as feature points from the first image frame 712. For example, feature points of major facial parts that may include an eyebrow, an eye, a nose and a mouth are detected. A face region 732 is detected from the first image frame 712 based on the detected landmarks 722. The detected face region 732 is extracted as a facial image 742 corresponding to the face region 732 through image cropping. Then, the image fusion apparatus generates a transformed facial image 762 by performing image warping on the facial image 742 such that feature points shown in the facial image 742 are placed at positions of predefined reference points 750. For example, the image warping is performed such that feature points of the eyebrow, the nose, and the mouth shown in the facial image 742 are placed at positions of the reference points 750 respectively corresponding to the eyebrow, the nose, and the mouth.

The same process is also performed with respect to the second image frame 714. When the second image frame 714 is input, the brightness of the second image frame 714 is measured. In response to the measured brightness being less than the threshold value, the image fusion apparatus detects facial landmarks 724 from the second image frame 714. A face region 734 is detected from the second image frame 714 based on the detected landmarks 724. The detected face region 734 is extracted as a facial image 744 corresponding to the face region 734 through image cropping. Then, the image fusion apparatus generates a transformed facial image 764 by performing image warping on the facial image 744 such that feature points shown in the facial image 744 are placed at the positions of the predefined reference points 750.

In an example, the brightness of the image frame is measured after image warping is performed. In this example, the measured brightness of the image frame should be less than the preset threshold value to continuously perform the image fusion process based on the corresponding image frame. If the measured brightness is greater than or equal to the threshold value, the image fusion process is terminated or initialized.

The image fusion apparatus generates a combined image 770 by combining the transformed facial image 762 and the transformed facial image 764. For example, the image fusion apparatus generates the combined image 770 using any one or any combination of any two or more of a sum, an average, a weighted sum, or a weighted average of a pixel value of the transformed facial image 762 and a pixel value of the transformed facial image 764. Then, the image fusion apparatus generates a restored combined image 775 by restoring the shape of a face shown in the combined image 770 to its original shape shown in the image frame. The restored combined image 775 is applied to the second image frame 714. Through the above process, a resulting image in which the brightness of the face region is improved and a motion blur and noise are reduced is obtained. Thus, in a case of performing face verification using the corresponding resulting image, facial features are extracted more accurately, and thus an accuracy of face verification improves.

The image fusion is performed based on two image frames in the examples of FIGS. 6 and 7. However, examples are not limited thereto. The image fusion may also be performed with respect to at least three image frames.

FIG. 8 illustrates an example of a configuration of an image fusion apparatus.

Referring to FIG. 8, an image fusion apparatus 800 receives a series of image frames. The image fusion apparatus 800 detects feature points of an object from the image frames, and performs image fusion between the image frames based on the detected feature points. In this example, the image fusion apparatus 800 determines whether to perform the image fusion in view of image qualities of the image frames, for example, based on brightness level of each of the image frames. The image fusion apparatus 800 performs the at least one operation described or illustrated herein in relation to the image fusion method, and provides a result of face verification to a user.

The image fusion apparatus 800 includes at least one processor 810 and a memory 820. The processor 810 executes instructions to perform the at least one operation described with reference to FIGS. 1 through 4, 6 and 7. For example, the processor 810 detects first feature points of an object shown in a first image frame from the first image frame, and transforms the first image frame based on the detected first feature points and predefined reference points. For example, the processor 810 transforms the first image frame by performing image warping such that the first feature points are placed at positions of the reference points. In another example, the processor 810 detects a first object region from the first image frame based on the detected first feature points, and performs image warping on the first object region based on first feature points included in the detected first object region and the reference points.

Further, the processor 810 detects second feature points of the object shown in a second image frame from the second image frame, and transforms the second image frame based on the detected second feature points and the reference points. For example, the processor 810 transforms the second image frame by performing image warping such that the second feature points are placed at the positions of the reference points. In another example, the processor 810 detects a second object region from the second image frame based on the detected second feature points, and performs image warping on the second object region based on second feature points included in the detected second object region and the reference points.

The processor 810 is configured to generate a combined image by combining the transformed first image frame and the transformed second image frame. The processor 810 generates the combined image by combining a pixel value of each pixel of the transformed first image frame and a pixel value of each pixel of the transformed second image frame, for example, using any one or any combination of any two or more of a sum, an average, a weighted sum or a weighted average thereof. The processor 810 transforms the combined image based on a correspondence between the second feature points of the second image frame and the reference points. This includes a process of restoring the shape of the object transformed during the image fusion process to its original shape based on positions of the feature points shown in the second image frame.

The memory 820 is connected to the processor 810, and stores the instructions executable by the processor 810 and data to be computed by the processor 810 or data processed by the processor 810. The memory 820 includes a non-temporary computer-readable medium, for example, a high-speed random access memory (RAM) and/or a non-volatile computer-readable storage medium.

FIG. 9 illustrates an example of a configuration of a computing apparatus.

Referring to FIG. 9, a computing apparatus 900 is a device that performs an application field using the image fusion method described above. In an example, the computing apparatus 900 corresponds to the face verification apparatus of FIG. 5. The computing apparatus 900 may be, for example, an image processing apparatus, a smartphone, a wearable device, a tablet computer, a netbook computer, a laptop computer, a desktop computer, a personal digital assistants (PDA), a set-top box, a home appliance, a biometric door lock, a security apparatus, or a vehicle starting apparatus. The computing apparatus 900 may perform the same operations of the image fusion apparatus 800 of FIG. 8, as well as other operations of the computer apparatus 900.

Referring to FIG. 9, the computing apparatus 900 includes a processor 910, a storage device 920, a camera 930, an input device 940, an output device 950 and a network interface 960. The processor 910, the storage device 920, the camera 930, the input device 940, the output device 950 and the network interface 960 communicate with each other through a communication bus 970.

The processor 910 executes functions and instructions to be executed by the computing apparatus 900. For example, the processor 910 processes instructions stored in the storage device 920. The processor 910 performs the at least one operation described with reference to FIGS. 1 through 8.

The storage device 920 stores information or data required for the execution of the processor 910. The storage device 920 includes a computer-readable storage medium or a computer-readable storage device. The storage device 920 stores the instructions to be executed by the processor 910, and store related information while an application or software is executed by the computing apparatus 900.

The camera 930 captures an image including a plurality of image frames. For example, the camera 930 captures a user attempting a face verification and acquires a query facial image including a plurality of image frames.

The input device 940 receives an input from the user through a tactile, video, audio or touch input. The input device 940 includes, for example, a keyboard, a mouse, a touch screen, a microphone, or another predetermined device that detects the input from the user and transmits the detected input to the computing apparatus 900.

The output device 950 provides an output of the computing apparatus 900 to the user through a visual, auditory or tactile channel. The output device 950 includes, for example, a display, a touch screen, a speaker, a vibration generator, or another predetermined device that provides the output to the user. The network interface 960 communicates with an external device through a wired or wireless network.

Referring to FIG. 10, the computing apparatus 1000 includes a camera 1300 and a display 1500. The display 1500 displays a captured image 1400 of a user's face 1100, using camera 1300, during a face verification or authentication process.

The image fusion apparatuses 100 and 800, the computing apparatus 900, the processor 910, storage device 920, camera 930, input device 940, output device 950, and network interface 960, the computing apparatus 1000, face 1100, camera 1300, display 1500, and other apparatuses, units, modules, devices, and other components described herein with respect to FIGS. 1-10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented image fusion method, comprising:
    detecting first feature points of an object in a first image frame from the first image frame;
    transforming the first image frame based on the detected first feature points and predefined reference points to generate a transformed first image frame;
    detecting second feature points of the object in a second image frame from the second image frame;
    transforming the second image frame based on the detected second feature points and the predefined reference points to generate a transformed second image frame;
    generating a combined image by combining the transformed first image frame and the transformed second image frame;
    inverse transforming the combined image based on a correspondence between the second feature points and the predefined reference points;
    generating a resulting image by applying the inverse transformed combined image to the second image frame; and
    performing object verification or authentication of the object based on the resulting image.

2. A non-transitory computer-readable storage medium storing instructions that, when executed by a processor, cause the processor to perform the image fusion method of claim 1.

3. The image fusion method of claim 1, wherein the detecting of the first feature points comprises detecting facial landmarks from the first image frame, and the detecting of the second feature points comprises detecting facial landmarks from the second image frame.

4. The image fusion method of claim 1,
    wherein a first operation, including the detection of the first feature points and the transforming of the first image frame, and the generating of the combined image are selectively performed based on a determining of whether a measured image quality of the first image frame or the transformed first image frame meets a preset threshold value, and
    wherein a second operation, including the detection of the second feature points and the transforming of the second image frame, and the generating of the combined image are selectively performed based on a determining of whether a measured image quality of the second image frame or the transformed second image frame meets the preset threshold value.

5. The image fusion method of claim 4, further comprising:
    measuring the image quality of the first image frame or the transformed first image frame; and
    measuring the image quality of the second image frame or the transformed second image frame,
    wherein the measuring of the image quality of the first image frame and the measuring of the image quality of the second image frame respectively comprise measuring a brightness of the first image frame and measuring a brightness of the second image frame.

6. The image fusion method of claim 1,
    wherein the transforming of the first image frame includes transforming the first image frame such that the first feature points are respectively placed at, or respectively warped with respect to, positions of the predefined reference points to generate the transformed first image frame, and
    wherein the transforming of the second image frame includes transforming the second image frame such that the second feature points are respectively placed at, or respectively warped with respect to, positions of the predefined reference points to generate the transformed second image frame.

7. The image fusion method of claim 1,
    wherein the transforming of the first image frame comprises:
    detecting a first object region from the first image frame based on the detected first feature points; and
    transforming the first object region through an image warping technique based on first feature points included in the detected first object region and the predefined reference points, and
    wherein the transforming of the second image frame comprises:
    detecting a second object region from the second image frame based on the detected second feature points; and
    transforming the second object region through the image warping technique based on second feature points included in the detected second object region and the predefined reference points.

8. The image fusion method of claim 7, wherein the generating of the combined image comprises combining the transformed first object region and the transformed second object region.

9. The image fusion method of claim 1, wherein the generating of the combined image comprises combining a first pixel value of the transformed first image frame and a second pixel value of the transformed second image frame.

10. The image fusion method of claim 9, wherein the combining of the first pixel value and the second pixel value includes any one or any combination of any two or more of a summing, an averaging, a weighted summing, and a weighted averaging of the first pixel value and the second pixel value at corresponding positions in the transformed first image frame and the transformed second image frame.

11. The image fusion method of claim 1, further comprising:
- detecting third feature points of the object shown in a third image frame from the third image frame;
- transforming the third image frame based on the detected third feature points and the reference points; and
- combining the obtained combination image and the transformed third image frame.

12. An image fusion apparatus, comprising:
a processor configured to:
- detect first feature points of an object in a first image frame from the first image frame;
- transform the first image frame based on the detected first feature points and predefined reference points to generate a transformed first image frame;
- detect second feature points of the object in a second image frame from the second image frame;
- transform the second image frame based on the detected second feature points and the predefined reference points to generate a transformed second image frame;
- generate a combined image by combining the transformed first image frame and the transformed second image frame;
- inverse transform the combined image based on a correspondence between the second feature points and the predefined reference points;
- generate a resulting image by applying the inverse transformed combined image to the second image frame; and
- perform object verification or authentication of the object based on the resulting image.

13. The image fusion apparatus of claim 12,
wherein the processor is configured to selectively perform a first operation, including the detection of the first feature points and the transforming of the first image frame, and the generating of the combined image based on a determining of whether a measured image quality of the first image frame or the transformed first image frame meets a preset threshold value, and
wherein the processor is configured to selectively perform a second operation, including the detection of the second feature points and the transforming of the second image frame, and the generating of the combined image based on a determining of whether a measured image quality of the second image frame or the transformed second image frame meets the preset threshold value.

14. The image fusion apparatus of claim 13, wherein the processor is further configured to:
- measure the image quality of the first image frame or the transformed first image frame; and
- measure the image quality of the second image frame or the transformed second image frame, wherein the measuring of the image quality of the first image frame and the measuring of the image quality of the second image frame respectively comprise measuring a brightness of the first image frame and measuring a brightness of the second image frame.

15. The image fusion apparatus of claim 12,
wherein, for the detection of the first feature points, the processor is configured to detect facial landmarks from the first image frame, and
wherein, for the detection of the second feature points, the processor is configured to detect facial landmarks from the second image frame.

16. The image fusion apparatus of claim 12,
wherein the transformation of the first image frame includes a transformation of the first image frame such that the first feature points are respectively placed at, or respectively warped with respect to, positions of the predefined reference points to generate the transformed first image frame, and
wherein the transformation of the second image frame includes a transformation of the second image frame such that the second feature points are respectively placed at, or respectively warped with respect to, positions of the predefined reference points to generate the transformed second image frame.

17. The image fusion apparatus of claim 12, wherein the processor is further configured to:
- detect a first object region from the first image frame based on the detected first feature points, and perform transformation of the first object region through an image warping technique based on first feature points included in the detected first object region and the predefined reference points, and
- detect a second object region from the second image frame based on the detected second feature points, and transform the second object region through the image warping technique based on second feature points included in the detected second object region and the predefined reference points.

18. The image fusion apparatus of claim 12, wherein, for the generation of the combined image, the processor is further configured to combine a first pixel value of the transformed first image frame and a second pixel value of the transformed second image frame.

19. The image fusion apparatus of claim 18, wherein a combination of the first pixel value and the second pixel value includes any one or any combination of any two or more of a summing, an averaging, a weighted summing, and a weighted averaging of the first pixel value and the second pixel value at corresponding positions in the transformed first image frame and the transformed second image frame.

* * * * *